Patented July 21, 1925.

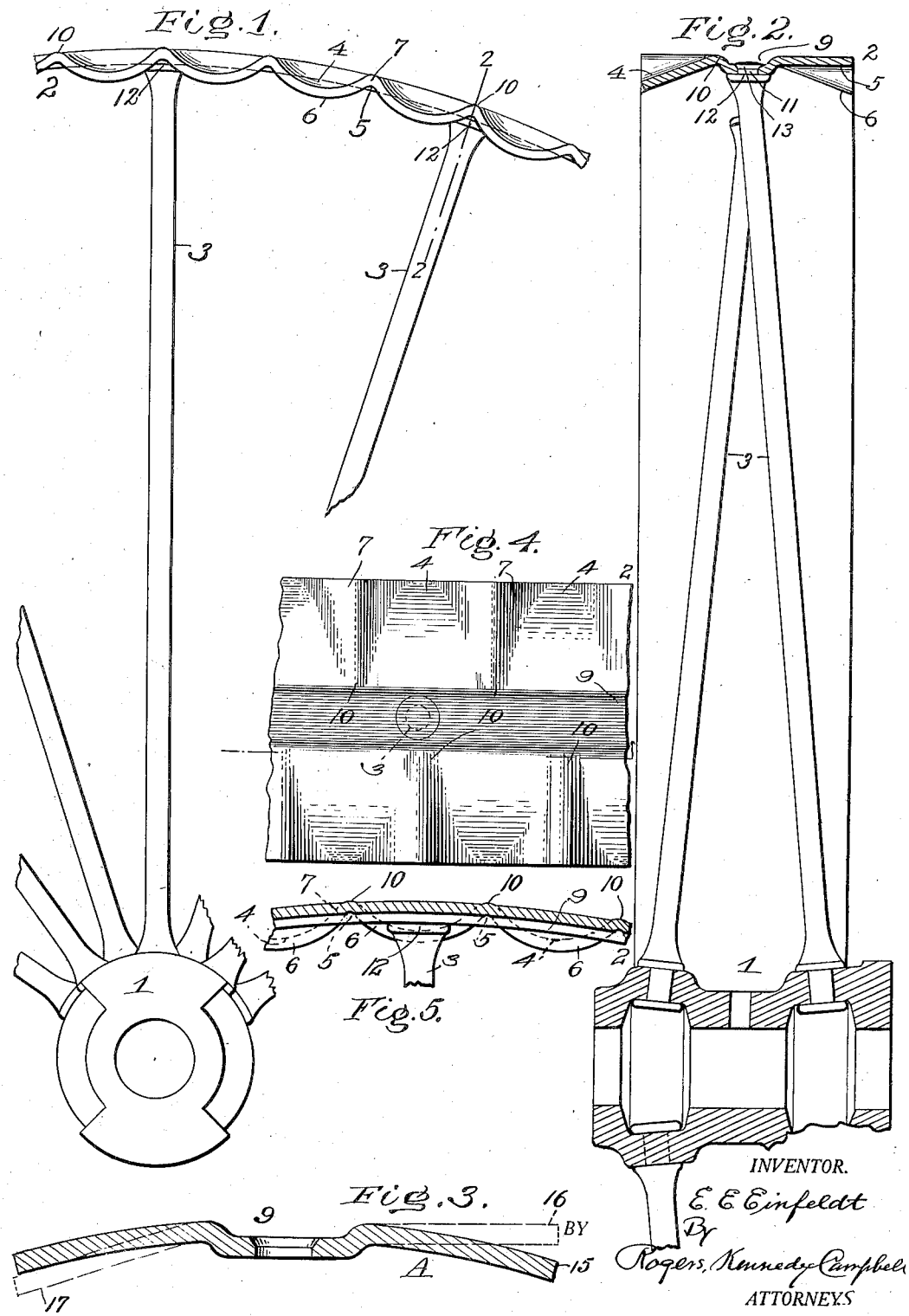

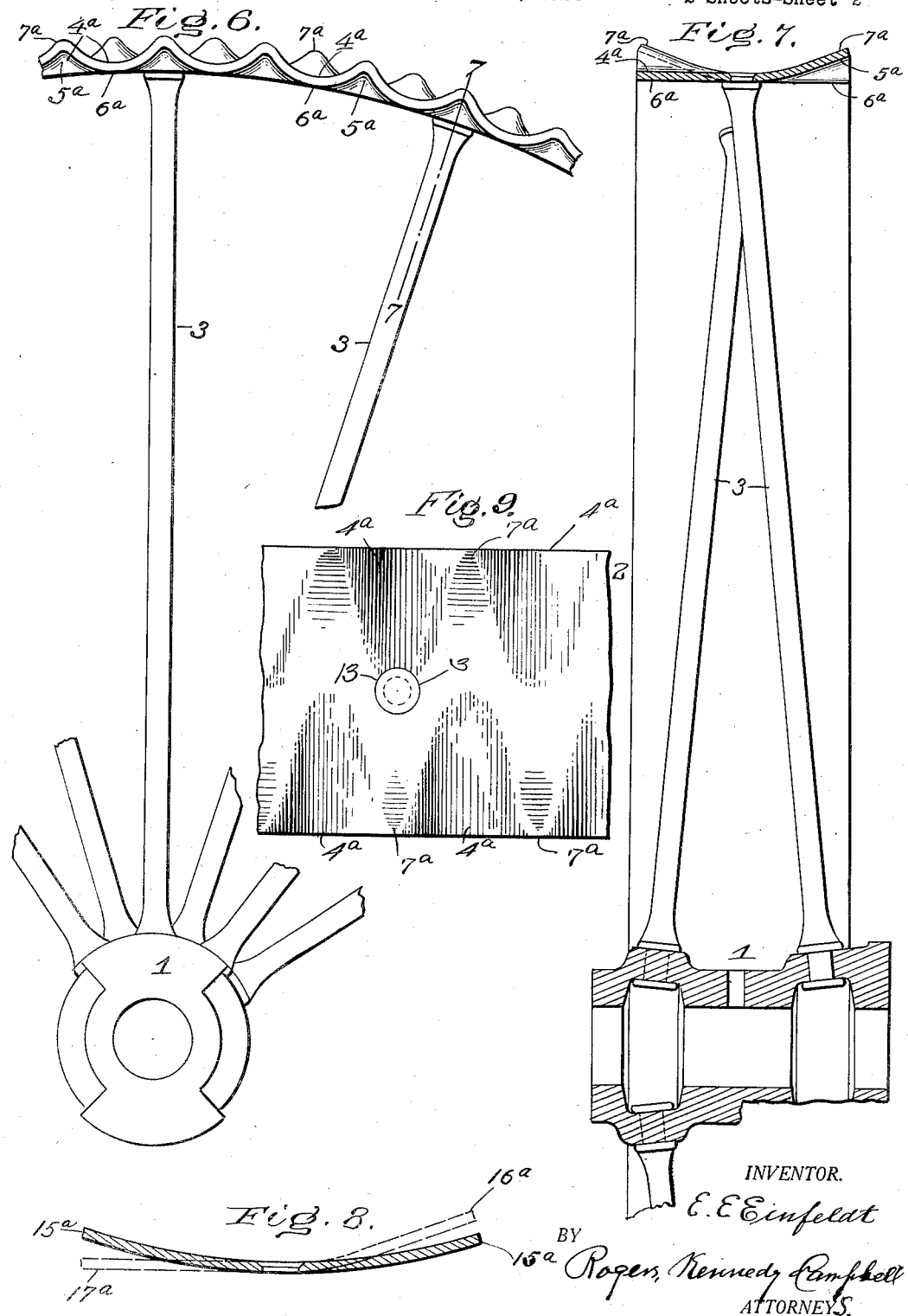

1,546,722

UNITED STATES PATENT OFFICE.

ERNEST E. EINFELDT, OF DAVENPORT, IOWA, ASSIGNOR TO G. WATSON FRENCH, JOSEPH L. HECHT, AND W. H. STACKHOUSE, AND COMPOSING THE FIRM OF FRENCH & HECHT, OF DAVENPORT, IOWA.

METAL WHEEL AND RIM THEREFOR.

Application filed February 29, 1924. Serial No. 696,013.

*To all whom it may concern:*

Be it known that I, ERNEST E. EINFELDT, a citizen of the United States, residing at Davenport, in the county of Scott and State of Iowa, have invented certain new and useful Improvements in Metal Wheels and Rims Therefor, of which the following is a specification.

This invention relates to metal wheels, and has reference more particularly to the form and construction of the wheel rim to give it tractive qualities such as result from the provision of traction lugs.

The object of the invention is to provide a wheel rim having integral traction lugs thereon formed by the displacement or bending of the metal of the rim, which rim will possess great strength and stiffness, and in which the maximum height of traction lugs is obtained by the minimum bend or stretch of the metal; and with these and other objects in view the invention consists of an improved wheel rim of the novel form and construction to be fully described in the specification to follow; and also of the improved method for forming a rim embodying such novel characteristics.

In the accompanying drawings:

Fig. 1 is a side elevation of a portion of a metal wheel having a rim embodying my invention.

Fig. 2 is a longitudinal section through the same on the line 2—2 of Fig. 1 as viewed from the left in said figure, Fig. 3 is a transverse section on an enlarged scale showing the rim in a certain stage of its formation.

Fig. 4 is a plan view on an enlarged scale of a portion of the rim shown in Figs. 1 and 2.

Fig. 5 is a sectional elevation of the same on the line 5—5 of Fig. 4.

Fig. 6 is a view similar to Fig. 1 of a modified form of the rim.

Fig. 7 is a longitudinal section through the same on the line 7—7 of Fig. 6 as viewed from the left in said figure.

Fig. 8 is a transverse section on an enlarged scale showing the rim of the form of Figs. 6 and 7 in a certain stage of its formation.

Fig. 9 is a plan view on an enlarged scale of a portion of the rim of Figs. 6 and 7.

Referring to the drawings:

Referring to Figs. 1 to 5, a portion of a wheel is shown comprising a hub 1, a rim 2 constructed in accordance with my invention, and spokes 3 connecting the rim and hub.

The rim is of sheet metal, and in the form of the invention shown in Figs. 1 to 5, it is of general arcuate form in cross section, and at each of its marginal edges it is formed with outer cavities 4 and with inner cavities 5 alternating with each other around the circumference of the rim and facing alternately in opposite directions, the projections 7 produced by the formation of the cavities 5 forming traction lugs which are disposed at intervals around the rim and which are separated from each other by the intermediate cavities 4. These cavities and projections extend transversely of the rim, being of the greatest depth at the marginal edges and gradually decreasing in depth towards the center of the rim where they vanish in the central tread portion.

As shown particularly in Figs. 2 and 4, the rim contains a central circumferential groove 9 facing outwardly, and the cavities and corresponding projections forming the traction lugs as described, terminate at their inner adjacent ends in the side walls of the groove, slightly intersecting the same as shown in Figs. 4 and 5 and thereby producing slight projections 10 on said walls at intervals around the rim. These walls of the groove constitute the central tread portion of the rim, which tread portion rolls on hard roads or ground with no roughness of travel except as produced by the slight projections 10, but on softer roads or soil, the tread sinks and the traction lugs are brought into action with the usual tractive function and effects familiar to those skilled in the art.

The spokes are provided at their outer extremities with reduced ends 11 and with adjacent shoulders 12, which ends are passed through holes in the bottom wall of the circumferential groove of the rim, with the shoulders seated against the inner face of the rim, and the reduced ends are upset to form fastening heads 13 which seat in the circumferential groove.

The effect of the formation of the marginal edges of the rim as described is to give them a wavy outline and produce corrugations which join each other circumferentially of the rim and extend continuously around the entire circumference of the rim. This formation produces a construction of great strength and stiffness, and enables a maximum height of traction lug to be formed with a minimum bend or displacement of the metal. This will be apparent from the novel method of formation of the rim which will now be described.

A sheet metal blank A is provided which as shown in Fig. 3 is formed with the central circumferential groove 9 and which is given the arcuate form in cross section as shown. The marginal edges of the blank are now by suitable means or devices bent alternately in opposite directions from a common base line represented by the edges 15, said edges being bent upwardly at intervals as indicated by the dotted line 16 at the right of the figure and being bent downwardly at intervals as indicated by the dotted line 17 at the left of the figure, thereby producing the oppositely facing depressions or cavities 4 and 5 and the traction lugs 7 as shown in Fig. 1.

The wheel rim described while arcuate in cross section is specifically crowned or convex on its outer surface. In Figs. 6, 7, 8 and 9 the invention is shown embodied in a rim which while also arcuate in cross section is of the opposite transverse curvature, or in other words is concave at its outer surface. In this case, as in the first case described, the marginal edges of the rim are bent alternately outwardly and inwardly from a common base line represented by the edges 15ª of the blank shown in Fig. 8 and as indicated by the dotted lines 16ª and 17ª in said figure, thereby producing outer cavities 4ª and inner cavities 5ª, the projections 7ª resulting from the formation of the inner cavities constituting the traction lugs. And, similarly in this case, the marginal edges of the rim are wavy in outline and the rim is in effect formed with corrugations joining each other and extending continuously around the entire circumference. The method of formation of a rim of this construction is the same as that first described except that the circumferential groove 9 is omitted and the transverse curvature of the rim is reversed to make it concave instead of convex.

It will be observed that due to the bending of the marginal edges alternately in opposite directions as described, a portion of the effective height of the traction lugs is given by the bending of a section of the metal in one direction and the remaining portion is given by bending an adjacent section of the metal in the opposite direction so that a given section of metal is displaced for substantially a half of the height of the lug produced. This method of procedure produces a rim which is of great stiffness and strength throughout its transverse and circumferential extent, and is free from the weakness which would be created by an undue stretch or bending of the metal.

I lay no claim herein to the method set forth in the foregoing description, for forming the rim claimed herein, as such method is made the basis of a separate application filed as a division hereof September 29, 1924, Serial No. 740,434.

While in the foregoing description and accompanying drawings I have set forth my invention in the particular detailed form and construction which I prefer to adopt, and while the method of procedure is described as embodying the specific steps suitable for the ends in view, it will be understood that the details and specific steps of the method of procedure may be variously changed without departing from the spirit of the invention; and it will be also understood that the invention is not limited to any particular form or construction of the parts or the method of procedure except in so far as such limitations are specified in the claims.

Having thus described my invention, what I claim is:

1. A wheel rim of sheet metal of substantially uniform thickness throughout, said rim having its marginal edges structurally displaced alternately in opposite directions from a common base line, said displacement resulting in cavities at its marginal edges facing alternately outwardly and inwardly and having projections correspnding to the cavities, the outwardly facing projections constituting traction lugs.

2. A wheel rim of sheet metal structurally displaced at its marginal edges alternately in opposite directions from a common base line, said displacement resulting in oppositely facing cavities and corresponding projections, the outwardly facing projections constituting traction lugs whose effective height is substantially greater than the distance of displacement of the metal in one direction from said base line.

3. A wheel rim of sheet metal structurally displaced at its marginal edges alternately in opposite directions from a common base line, said displacement resulting in oppositely facing cavities and corresponding projections, the outwardly facing projections constituting traction lugs whose effective height are substantially twice that of the distance of displacement of the metal in one direction from said base line.

4. A sheet metal rim of substantially uniform thickness throughout and having its marginal edges structurally displaced alternately outwardly and inwardly from a common base line, said displacement resulting in outwardly facing projections constituting traction lugs separated by outwardly facing cavities, and inwardly facing cavities corresponding in position to the traction lugs, and inwardly facing projections corresponding in position to the outwardly facing cavities.

5. A metal wheel rim formed at its center with a circumferential groove facing outwardly, said rim having at its marginal edges cavities and corresponding projections, facing alternately outwardly and inwardly and forming traction lugs, the said cavities decreasing in depth toward the groove and intersecting the walls of said groove, and forming projections thereon at intervals.

6. A metal wheel comprising a hub, a metal rim provided with a circumferential groove facing outwardly, said rim having its marginal edges extending alternately outwardly and inwardly and forming traction lugs, spokes connected at their inner ends to the hub, and fastening heads on the outer ends of the spokes seated in said circumferential groove.

In testimony whereof, I have affixed my signature hereto.

ERNEST E. EINFELDT.